United States Patent
Friedel et al.

(10) Patent No.: US 11,560,171 B2
(45) Date of Patent: Jan. 24, 2023

(54) METHOD FOR OPERATING A STEERING DEVICE, AND STEERING DEVICE

(71) Applicant: Robert Bosch GmbH, Stuttgart (DE)

(72) Inventors: Michael Friedel, Ruppertshofen (DE); Sven Begerow, Schwäbisch Gmünd (DE); Andreas Riedinger, Schwäbisch Gmünd (DE); Florian Geiger, Schwäbisch Gmünd (DE)

(73) Assignee: Robert Bosch GmbH, Stuttgart (DE)

(*) Notice: Subject to any disclaimer, the term of this patent is extended or adjusted under 35 U.S.C. 154(b) by 390 days.

(21) Appl. No.: 16/635,871

(22) PCT Filed: Aug. 8, 2018

(86) PCT No.: PCT/EP2018/071456
§ 371 (c)(1),
(2) Date: Jan. 31, 2020

(87) PCT Pub. No.: WO2019/048164
PCT Pub. Date: Mar. 14, 2019

(65) Prior Publication Data
US 2020/0255054 A1    Aug. 13, 2020

(30) Foreign Application Priority Data
Sep. 8, 2017 (DE) .......... 10 2017 215 842.5

(51) Int. Cl.
*H02P 6/08* (2016.01)
*B62D 5/04* (2006.01)

(52) U.S. Cl.
CPC .......... *B62D 5/046* (2013.01); *B62D 5/0421* (2013.01); *B62D 5/0496* (2013.01); *H02P 6/085* (2013.01); *H02P 2205/05* (2013.01)

(58) Field of Classification Search
CPC .... B62D 5/046; B62D 5/0421; B62D 5/0496; H02P 6/085; H02P 2205/05
See application file for complete search history.

(56) References Cited

U.S. PATENT DOCUMENTS

| | | | | |
|---|---|---|---|---|
| 8,700,245 B2* | 4/2014 | Meitinger | ........... | B60W 30/188 701/99 |
| 2004/0189239 A1* | 9/2004 | Islam | ....................... | H02P 21/16 318/701 |

(Continued)

FOREIGN PATENT DOCUMENTS

| | | |
|---|---|---|
| CN | 102574540 A | 7/2012 |
| CN | 103958317 A | 7/2014 |

(Continued)

OTHER PUBLICATIONS

International Search Report corresponding to PCT Application No. PCT/EP2018/071456, dated Nov. 22, 2018 (German and English language document) (5 pages).

*Primary Examiner* — Rina I Duda
(74) *Attorney, Agent, or Firm* — Maginot, Moore & Beck LLP

(57) ABSTRACT

A method operates a steering device which comprises at least one electric motor that can be operated with an increased torque lying between a nominal torque of the electric motor and a maximum torque of the electric motor over an entire basic setting range. In at least one operating state, a threshold torque of the electric motor is at least temporarily limited to a reduced torque, in particular in comparison to the maximum torque, at least depending on at least one temperature characteristic variable.

12 Claims, 11 Drawing Sheets

(56) References Cited

U.S. PATENT DOCUMENTS

| | | | | |
|---|---|---|---|---|
| 2005/0043873 | A1* | 2/2005 | Mir | B62D 5/046 |
| | | | | 180/443 |
| 2005/0096813 | A1* | 5/2005 | Heilig | B62D 5/046 |
| | | | | 701/41 |
| 2009/0266187 | A1* | 10/2009 | Okada | F16H 25/24 |
| | | | | 74/89.23 |
| 2011/0118937 | A1* | 5/2011 | Kariatsumari | B62D 5/0496 |
| | | | | 701/41 |
| 2012/0191301 | A1* | 7/2012 | Benyo | B62D 5/0463 |
| | | | | 701/41 |
| 2013/0138298 | A1* | 5/2013 | Derry | B62D 5/0481 |
| | | | | 701/42 |
| 2018/0208178 | A1* | 7/2018 | Owen | B60W 20/19 |

FOREIGN PATENT DOCUMENTS

| | | |
|---|---|---|
| DE | 10 2008 028 055 A1 | 12/2009 |
| DE | 10 2008 054 744 A1 | 6/2010 |
| DE | 10 2009 013 246 A1 | 9/2010 |
| DE | 10 2015 121 717 A1 | 6/2016 |
| JP | H09-221053 A | 8/1997 |
| JP | H11-122703 A | 4/1999 |
| JP | H11-278289 A | 10/1999 |
| JP | 2000-255443 A | 9/2000 |
| JP | 2002-211425 A | 7/2002 |
| JP | 2006-174611 A | 6/2006 |
| JP | 2008-62916 A | 3/2008 |
| JP | 2008-109816 A | 5/2008 |
| JP | 2009-12662 A | 1/2009 |
| JP | 2016-111811 A | 6/2016 |

* cited by examiner

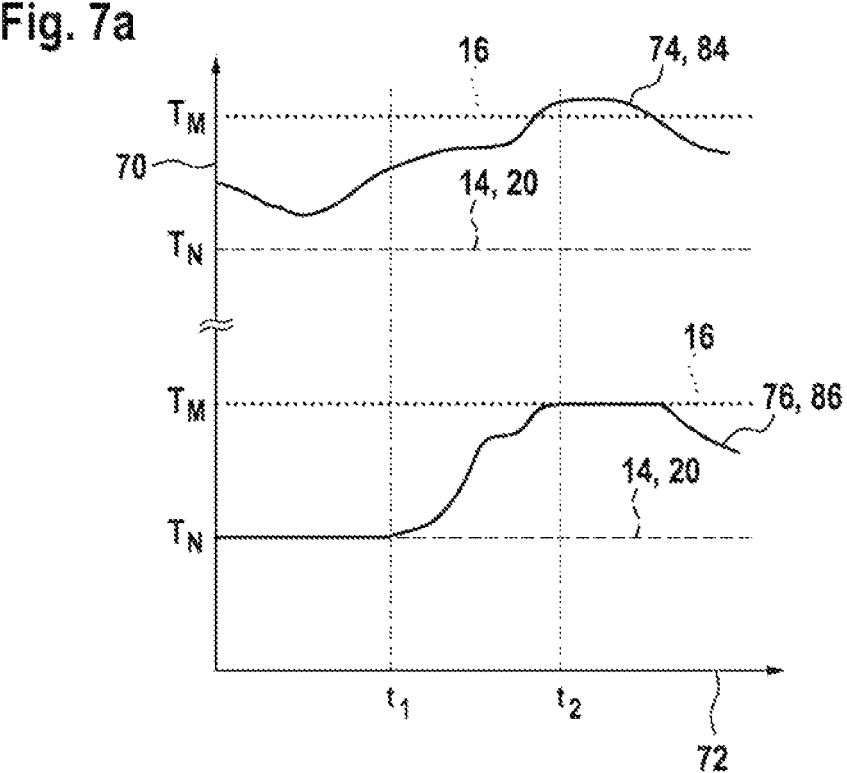
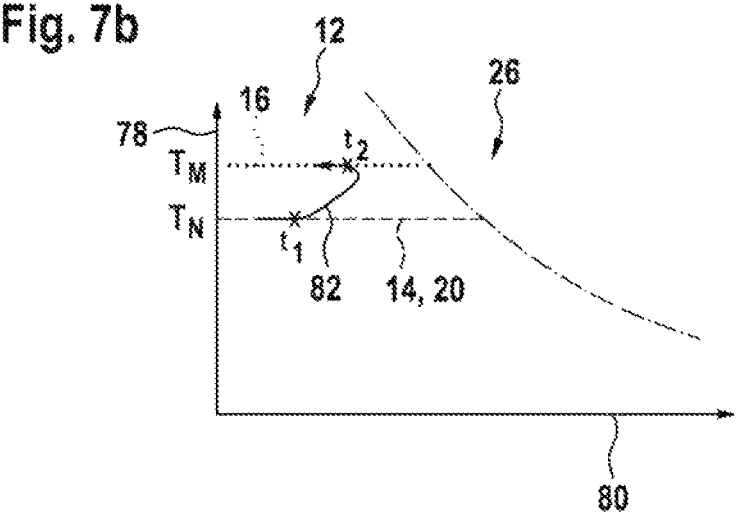

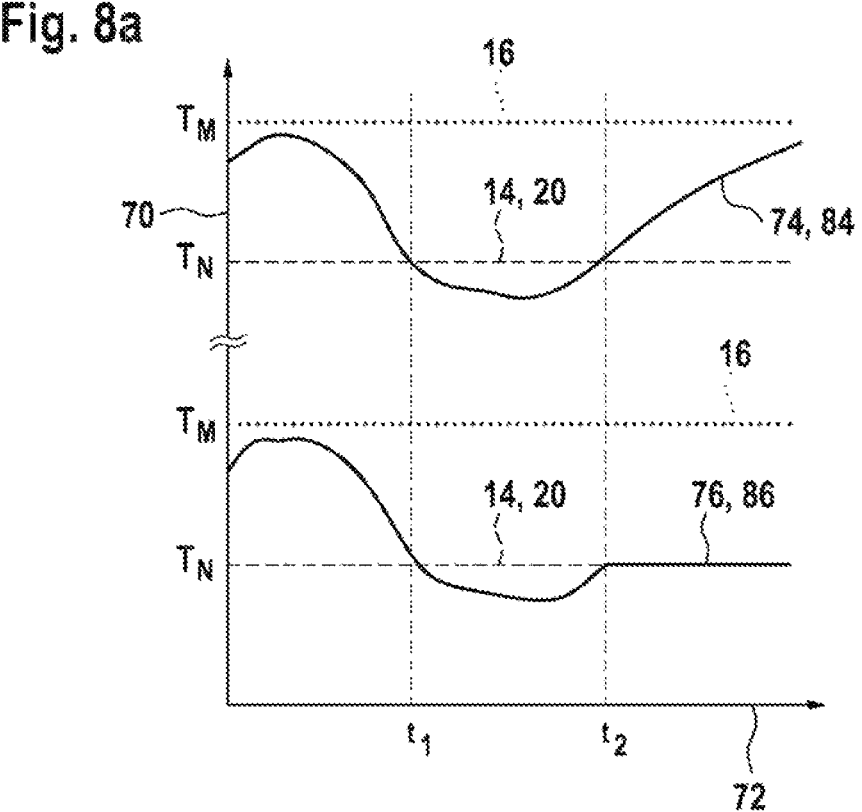
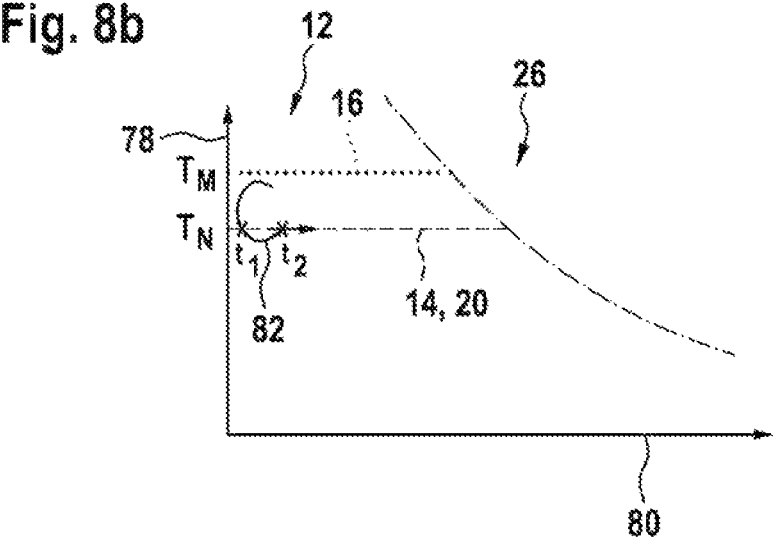

METHOD FOR OPERATING A STEERING DEVICE, AND STEERING DEVICE

This application is a 35 U.S.C. § 371 National Stage Application of PCT/EP2018/071456, filed on Aug. 8, 2018, which claims the benefit of priority to Serial No. DE 10 2017 215 842.5, filed on Sep. 8, 2017 in Germany, the disclosures of which are incorporated herein by reference in their entirety.

BACKGROUND

The disclosure relates to a method for operating a steering apparatus.

Moreover, the disclosure relates to a steering apparatus and also a control device.

Steering systems having electric motors, by way of example for providing steering assistance and/or an additional steering angle, are known from the prior art. The electric motors that are used in this case are generally rigidly prespecified and may only be selected from a small group of electric motors that may be used with the result that the electric motors consequently cannot be arbitrarily exchanged. Moreover, the electric motors comprise a prespecified torque range that is nominally designed for a defined operating point of the electric motor. In the case of steering systems, this operating point in general corresponds to a state in which the electric motor must output a full torque when the motor shaft is at a standstill, by way of example when steering against a curb.

In different driving situations and/or application states, there is therefore often the desire to operate the prespecified electric motor using a torque that is increased in comparison to a nominal torque, which however leads to problems owing to an increased temperature load of the electric motor and/or further components of the steering system.

In this context, by way of example DE 10 2008 054 744 A1 discloses a method in which a torque of an electric motor may be increased in that a load bridge branch is identified in a control circuit of the electric motor and in dependence upon operating values of the electric motor or the desired specifications of said operating values a modification of a control signal of the control circuit is initiated in particular in such a manner that switching procedures are not implemented in the load bridge branch. An active procedure of taking into account a temperature parameter and/or an active limitation of a maximum torque or a limit torque is however not performed.

The object of the disclosure in particular is to provide a method for operating a steering apparatus and also to provide a steering apparatus having improved characteristics with regard to a flexibility. The object is achieved by virtue of the features disclosed herein while advantageous embodiments and further developments of the disclosure are apparent in the dependent claims.

SUMMARY

The disclosure relates to a method for operating a steering apparatus that comprises at least one electric motor that may be operated in an entire basic setting range, in particular at least temporarily, using an increased torque that is between a nominal torque of the electric motor and a maximum torque of the electric motor, wherein in at least one operating state in which the electric motor is preferably operated using an increased torque between the nominal torque and the maximum torque, in dependence upon at least one temperature parameter a limit torque of the electric motor is at least temporarily and in particular actively limited to a torque that is reduced, in particular in comparison to the maximum torque. The reduced torque is particularly advantageously the nominal torque of the electric motor. In particular, the limit torque of the electric motor in this case is limited to the reduced torque in the event of the temperature parameter being below and/or preferably exceeding a limit value. Moreover, a prevailing torque of the electric motor is reduced in this case in the event of the electric motor being operated in the operating state using a torque above the reduced torque, in particular in such a manner that the prevailing torque is lower than or identical to the reduced torque. It is possible by means of this embodiment in particular to increase a flexibility of the steering apparatus in that the steering apparatus may be operated at least temporarily using a torque that is increased in comparison to the nominal torque. It is simultaneously possible to achieve an advantageous distribution of heat in the electric motor, in particular without damaging and/or destroying the electric motor and/or further components of the steering apparatus owing to an increased temperature load. Furthermore, it is possible to advantageously simplify a control algorithm.

The term a "steering apparatus" in this context is to be understood in particular as at least one part, in particular a sub assembly, of a steering system, in particular of a vehicle and preferably a motor vehicle.

In particular, the steering apparatus may also comprise the entire steering system. Moreover, the steering apparatus comprises in particular a computing unit that is provided for the purpose of implementing the method for operating the steering apparatus. Furthermore, the steering apparatus may comprise further components and/or assemblies such as by way of example at least one control circuit for controlling the electric motor, said control circuit preferably being embodied as an inverter unit and/or end stage, and/or a sensor unit for ascertaining the at least one temperature parameter. The term "provided" is to be understood in particular as specifically programmed, designed and/or fitted. The fact that an object is provided for a specific function is in particular understood to mean that the object fulfils and/or performs this specific function in at least one application state and/or operating state.

The term a "computing unit" is in this context in particular understood to mean an electronic unit that comprises an information input, an information processing stage and an information output. Moreover, the computing unit advantageously comprises at least one processor, at least one storage device, at least one input means and/or output means, at least one operating program, at least one open-loop control routine, at least one closed-loop control routine and/or at least one calculating routine. In particular, the computing unit is at least provided for the purpose of at least temporarily and in particular actively limiting the limit torque of the electric motor in at least one operating state in dependence upon at least one temperature parameter to the torque that is reduced in comparison to the maximum torque. It is preferred that the computing unit is moreover integrated into a control device of the steering apparatus.

Furthermore, the electric motor is in particular embodied as a brushless motor and advantageously as an asynchronous motor or as a permanently-excited synchronous motor. Moreover, the electric motor may be part of an electric superimposed steering system and/or external power steering system and in particular may be provided so as to produce and/or to provide an additional steering angle and/or a variable transmission ratio. However, it is preferred that the electric motor is part of an electric power steering arrangement and in particular is provided so as to produce and/or to provide electric steering assistance. Advantageously, a prevailing torque of the electric motor is controlled in a closed-loop manner and/or set, in particular by means of the control circuit, in dependence upon a phase current of the electric motor. Furthermore, the electric motor in particular comprises a basic setting range and a field-weakening range that in particular directly adjoins the basic setting range. In this case, the basic setting range corresponds in particular to a rotational speed range of the electric motor in which the nominal torque, the maximum torque and/or the limit torque of the electric motor is constant. In particular, the basic setting range is in a rotational speed range between 0 rpm and 1000 rpm (rpm=rotations per minute), preferably between 0 rpm and 1500 rpm and particularly preferably between 0 rpm and 1800 rpm. The field-weakening range corresponds in particular to a rotational speed range of the electric motor in which the nominal torque, the maximum torque and/or the limit torque of the electric motor is variable and in particular drops with an increasing rotational speed.

Moreover, the term a "temperature parameter" is understood to mean in particular a parameter that is indirectly and/or directly correlated with a temperature of the electric motor. In particular, at least with the aid of the temperature parameter it is possible to conclude a temperature and/or a temperature load of the electric motor and/or a component of the steering apparatus, said component being operatively connected to the electric motor, and/or it is possible to determine a temperature and/or a temperature load of the electric motor and/or a component of the steering apparatus, said component being operatively connected to the electric motor.

Moreover, the term a "nominal torque" of the electric motor is to be understood in particular as a nominal torque of the electric motor and/or a maximum torque with which the electric motor may be operated permanently, said maximum torque being prespecified by a manufacturer and in particular being specific to the electric motor. The term a "maximum torque" of the electric motor is to be understood in particular as a maximum torque that the electric motor may output and/or provide owing to structural characteristics and/or limitations of the electric motor, the control circuit and/or an energy supply and/or the maximum that the electric motor may output and/or provide taking into account safety-technical aspects. In this case, the maximum torque is in particular at least 1%, preferably at least 5% and particularly preferably at least 10% higher than the nominal torque. Furthermore, the term a "reduced torque" is in particular to be understood as a torque that is at least 1%, preferably at least 4% and particularly preferably at least 9% lower than the maximum torque. Moreover, the term a "limit torque" of the electric motor is in particular understood to mean a maximum torque that the electric motor may output and/or provide at a specific point in time owing to a corresponding controlling procedure and/or control-technical specification. In particular, the limit torque in this case specifies an upper limit and/or limitation for the torque of the electric motor. Furthermore, the limit torque in the operating state is in particular identical to the reduced torque. It is preferred that the limit torque is identical to the maximum torque in at least one further operating state that is different from the operating state. The fact that "the limit torque is limited to the reduced torque" is to be understood in particular as that the limit torque is reduced in such a manner that the limit torque is identical to the reduced torque with the result that the reduced torque specifies an upper limit for the torque of the electric motor. Moreover, the phrase "between the nominal torque and the maximum torque" is in particular to also explicitly include the boundary values. Consequently, the electric motor may be operated in the entire basic setting range using a torque that may be identical to the nominal torque and/or the maximum torque.

Moreover, it is advantageously proposed that the operating state is an operating state in which a prevailing rotational speed of the electric motor is below a limit rotational speed, wherein the limit rotational speed is preferably between 20 rpm and 180 rpm and particularly preferably between 50 rpm and 100 rpm. Accordingly, in dependence upon the temperature parameter of the electric motor the limit torque is at least temporarily limited to the reduced torque advantageously at least in a lower rotational speed range of the electric motor, in particular between 20 rpm and 180 rpm and particularly preferably between 50 rpm and 100 rpm. Furthermore, in dependence upon the temperature parameter of the electric motor the limit torque may be at least temporarily limited to the reduced torque and/or to a further reduced torque that is different to the reduced torque, in particular also in an upper rotational speed range of the electric motor, in particular above 100 rpm or above 180 rpm, and/or above the limit rotational speed. However, it is particularly advantageously proposed that the electric motor is operated and/or may be operated using a torque that is increased in comparison to the nominal torque in at least one further operating state in which a prevailing rotational speed of the electric motor is above the limit rotational speed, at least for longer periods, in particular over a period of time of at least 5 min, preferably of at least 15 min, particularly preferably of at least 30 min and particularly advantageously of at least 60 min and advantageously permanently. As a consequence, it is possible in particular to reduce an increased temperature load of the steering apparatus in a lower rotational speed range in which a thermal load is distributed unevenly and/or insufficiently onto the components of the electric motor and/or the steering apparatus.

Furthermore, it is proposed that the temperature parameter is correlated with a temperature of the electric motor, in particular a rotor winding of the electric motor, with a temperature of a control circuit of the electric motor, in particular of a circuit breaker of the control circuit, with a movement of a motor shaft of the electric motor, with a rotor position of the electric motor, with a prevailing rotational speed of the electric motor, with a phase current of the electric motor and/or a period of time in which the electric motor is operated using a torque that is increased in comparison to the nominal torque. In particular, in this case the temperature parameter is determined with the aid of at least one of the above-mentioned values or a combination of more than one of the above-mentioned values. Advantageously for this purpose, the sensor unit may comprise at least one sensor for directly and/or indirectly ascertaining the temperature of the electric motor, at least one sensor for directly and/or indirectly ascertaining the temperature of the control circuit, at least one sensor for directly and/or indirectly ascertaining the movement of the motor shaft of the electric motor, at least one sensor for directly and/or indirectly ascertaining the rotor position of the electric motor, at least one sensor for directly and/or indirectly ascertaining the prevailing rotational speed of the electric motor, at least one sensor for directly and/or indirectly ascertaining the phase current of the electric motor and/or at least one sensor for directly and/or indirectly ascertaining the period of time in which the electric motor is operated using a torque that is increased in comparison to the nominal torque. The sensor unit may also be particularly preferably integrated into the control device and/or a sensor system of the control device may be provided so as to ascertain at least one of the above-mentioned values. Alternatively or in addition however, at least some of the above-mentioned values may also be calculated using control signals of the control circuit and/or of the electric motor or using a temperature model that is correlated with the control circuit and/or the electric motor. As a consequence, the temperature parameter may advantageously be determined in a flexible and/or simple manner. Moreover, in particular an advantageous check with regard to plausibility of the temperature parameter is possible.

Furthermore, it is proposed that a maximum output power of the electric motor remains unchanged when the electric motor is operated using a torque that is increased in comparison to the nominal torque. In this context, when the electric motor is operated using a torque that is increased in comparison to the nominal torque, namely an output power of the electric motor increases in comparison to an operation of the electric motor using the nominal torque, however a maximum output power of the electric motor remains constant. Accordingly, a maximum output power of the electric motor when the electric motor is operated using a torque that is increased in comparison to the nominal torque is identical to a maximum output power of the electric motor when the electric motor is operated using the nominal torque. The term a "maximum output power" of the electric motor is to be understood in particular as a maximum output power that the electric motor may output and/or provide owing to an energy supply that is prespecified and in particular cannot be changed, in particular of a vehicle electrical system. It is preferred that the steering apparatus and/or the steering system in this case are free of possible additional energy storage devices for increasing a maximum output power of the electric motor. As a consequence, in particular it is possible to provide a steering apparatus that is advantageously efficient, in particular energy efficient, installation space efficient and/or cost-efficient.

In a further embodiment of the disclosure, it is proposed that in at least one case in which the electric motor is operated in the operating state using a torque that is increased in comparison to the reduced torque, advantageously in comparison to the nominal torque, a transition from the increased torque to the reduced torque is performed by means of a continuous function that is preferably differentiable at any point, in particular a ramp function, an asymptotic function and/or a sigmoid function. In particular, the transition from the increased torque to the reduced torque in this case is performed gradually or successively and in particular not abruptly. In particular as a consequence, it is possible to achieve a smoother transition from the increased torque to the reduced torque. Moreover, a controlling procedure of this type is expedient in particular in the case of steering apparatuses since a torque that is output directly influences a steering sensation of a driver. Consequently, in this case a reduction of a prevailing torque may be advantageously unobtrusively configured in the steering sensation as a result of which in particular it is possible to achieve a particularly advantageous steering sensation. In particular, a driver is accustomed to the changed conditions and is not irritated by means of a transition of this type.

Alternatively or in addition, it is proposed that in at least one further case in which the electric motor is operated in the operating state using a torque that is increased in comparison to the reduced torque, advantageously in comparison to the nominal torque, the limit torque is only limited to the reduced torque if a prevailing torque of the electric motor is below the reduced torque. As a consequence, it is possible in particular to limit the limit torque, which advantageously does not have an effect on a steering sensation of a driver, with the result that it may be advantageously ensured that the driver does not notice the limitation in the steering sensation.

Moreover, it is particularly preferably proposed that the limitation of the limit torque to the reduced torque is removed in at least one further operating state in which a prevailing rotational speed of the electric motor reaches a field-weakening range of the electric motor and/or the electric motor is operated over a defined period of time, in particular of at least 1 min and preferably of at least 5 min, using the reduced torque and/or the nominal torque and/or below the reduced torque and/or the nominal torque. It is preferred that the limit torque of the electric motor in this case is set to the maximum torque and/or is removed in such a manner that the limit torque is identical to the maximum torque. As a consequence, the limitation may be particularly advantageously removed. If the limitation of the limit torque in this case is removed in the field-weakening range of the electric motor, it is possible to achieve a particularly advantageous steering sensation, in particular since the field-weakening range cannot be influenced by means of a procedure of controlling the electric motor but rather is specified and/or prespecified by means of a design of the electric motor.

It is possible to achieve a particularly advantageous protection of the steering apparatus, in particular if the temperature parameter is taken into account when the limitation is removed. Advantageously, the limitation of the limit torque to the reduced torque is only removed in this case in the event of the temperature parameter exceeding and/or preferably being below a further limit value.

In a particularly preferred embodiment of the disclosure, it is proposed that the limitation is removed in such a manner that a transition from a prevailing torque to a required increased torque is performed by means of a continuous function that is preferably differentiable at any point, in particular a ramp function, an asymptotic function and/or a sigmoid function. In particular, the transition from the prevailing torque to the required increased torque in this case is performed gradually or successively and in particular not abruptly. As a consequence, it is in particular possible to achieve a smoother transition and/or for a steering sensation to be advantageously improved.

The method for operating the steering apparatus in this case is not to be limited to the above-described application and embodiment. In particular, the method for operating the steering apparatus for fulfilling a function described herein may comprise a number that may deviate from a number that is mentioned herein of individual elements, components and units.

BRIEF DESCRIPTION OF THE DRAWINGS

Further advantages are apparent from the following description of the drawing. An exemplary embodiment of the disclosure is illustrated in the drawings. The drawing, the description and the claims include numerous features in combination. The person skilled in the art will expediently take the features into account individually and combine said features into expedient further combinations.

In the drawings:

FIG. 7a-b illustrate exemplary graphs of different signals of the electric motor and/or the control of the electric motor, FIG. 8a-b illustrate exemplary graphs of different signals of the electric motor and/or the control of the electric motor.

DETAILED DESCRIPTION

Figure 1:
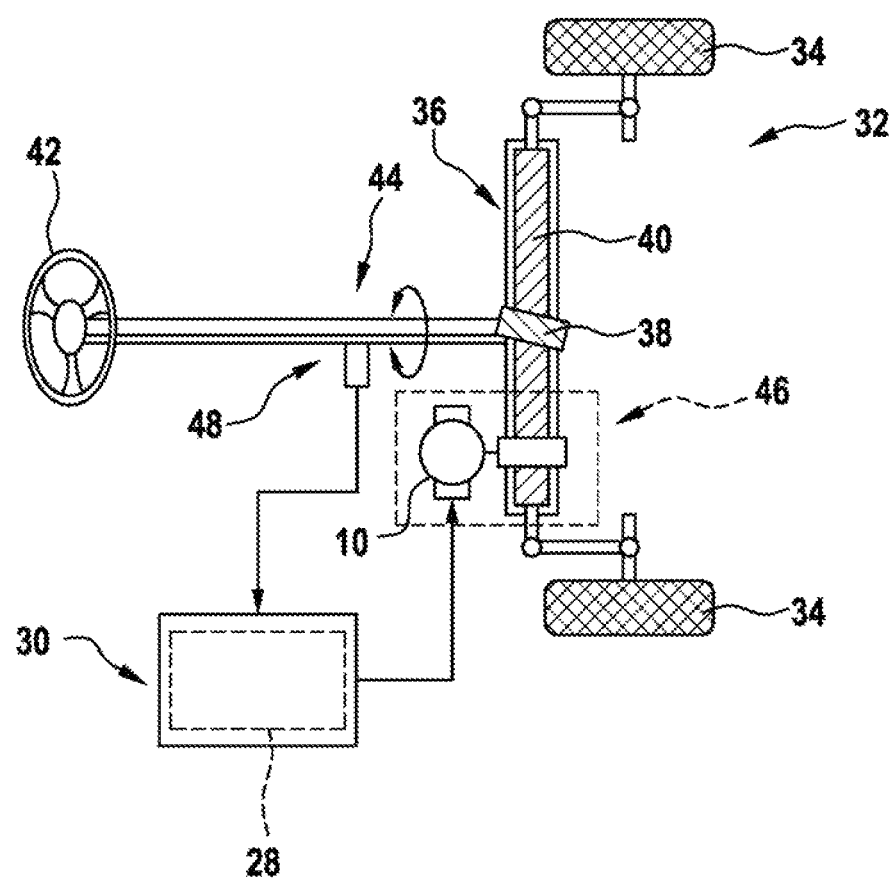
FIG. 1 illustrates an exemplary steering system having a steering apparatus in a simplified illustration.

FIG. 1 illustrates an exemplary steering system 32 in a perspective view. In the present case, the steering system 32 is embodied as an electrically-assisted steering system and accordingly comprises an electric power assisting arrangement. Moreover, the steering system 32 is provided for a use in a vehicle (not illustrated), in particular a motor vehicle. In an installed state, the steering system 32 comprises an operative connection to vehicle wheels 34 of the vehicle and is provided so as to influence a direction of travel of the vehicle. Alternatively or in addition, it is however also conceivable to embody a steering system having an electric superimposed steering system and/or external power steering system.

The steering system 32 comprises a steering apparatus. The steering apparatus comprises a steering gear 36 that is embodied in the present case as a known per se rack and pinion steering gear. The steering gear 36 comprises a steering pinion 38 and a rack 40 that is mechanically coupled to the steering pinion 38. The steering gear 36 is provided for the purpose of initiating a swivel movement and/or rotational movement of the vehicle wheels and in particular a steering input into a steering movement of the vehicle wheels 34. In this case, the steering gear 36 may be embodied by way of example as a recirculating ball steering gear, as a worm steering gear and/or as a screw spindle steering gear.

Furthermore, the steering apparatus comprises a steering unit 42 that in the present case is in particular embodied as a steering wheel, said steering unit being used so as to apply a manual steering torque and in particular so as to manually control the direction of travel of the vehicle, in particular by a driver. Alternatively, a steering unit may also be embodied as a steering lever or the like. A steering system may also principally be free from a steering unit, by way of example in the case of a vehicle that drives in a purely autonomous manner.

Moreover, the steering apparatus comprises a steering column 44 for the, in particular mechanical, connection of the steering unit 42 to the steering gear 36. Moreover, in this case the steering column 44 comprises at least one torsion element (not illustrated), in the present case in particular a torsion bar, which is provided so as to twist in dependence upon the manual steering torque. Alternatively, a steering column could also periodically connect a steering unit to a steering gear, such as by way of example in the case of a vehicle having an autonomous driving operation and/or a steer-by-wire steering system having a mechanical fallback level.

Furthermore, the steering apparatus comprises a support unit 46 for producing and/or providing steering assistance, said support unit in particular being embodied electrically. The support unit 46 is provided for the purpose of introducing a supporting torque into the steering gear 36 and supporting the manual steering torque that is in particular provided by the driver.

For this purpose, the support unit 46 comprises an electric motor 10 that in the present case in particular is embodied as a permanently-excited synchronous motor. The electric motor 10 is embodied as a multiphase, in the present case an exemplary three-phase, electric motor. The electric motor 10 is operatively connected to the steering gear 36, in particular the rack 40. The electric motor 10 is part of the electric power steering arrangement and in particular is provided so as to produce the electric steering assistance. Alternatively, an electric motor could also be part of an electric superimposed steering system and/or external power steering system and may be provided in particular so as to produce and/or to provide an additional steering angle and/or a variable transmission ratio. Moreover, an electric motor may also be embodied as a single-phase, as a six-phase or as a twelve-phase electric motor.

Moreover, the steering apparatus comprises an angle sensor 48 that is in particular embodied as a torque sensor. The angle sensor 48 is arranged in a region of the torsion element and is provided so as to ascertain, in particular in a contactless manner, an angle signal that is in particular correlated with the torsion element. In this case, the angle signal is a measure for the manual steering torque that is in particular applied by the driver. In principle, an angle sensor could however also be embodied as an angle difference sensor or the like.

Furthermore, the steering apparatus comprises a control device 30. The control device 30 comprises an operative connection to the angle sensor 48 and to the support unit 46. The control device 30 is provided for the purpose of receiving the angle signal from the angle sensor 48. Moreover, the control device 30 is provided so as to control the electric motor 10 and consequently in particular so as to set the supporting torque, in particular in dependence upon the angle signal.

For this purpose, the control device 30 comprises a computing unit 28. The computing unit 28 comprises at least one processor (not illustrated), by way of example in the form of a microprocessor, and at least one storage device (not illustrated). Moreover, the computing unit 28 comprises at least one operating program having at least one calculating routine, at least one open-loop control routine and at least one closed-loop control routine, said operating program being stored in the storage device.

Furthermore, the steering apparatus may comprise further components and/or assemblies, such as by way of example at least one sensor unit (not illustrated) for ascertaining vehicle parameters and/or environmental parameters.

Figure 2:
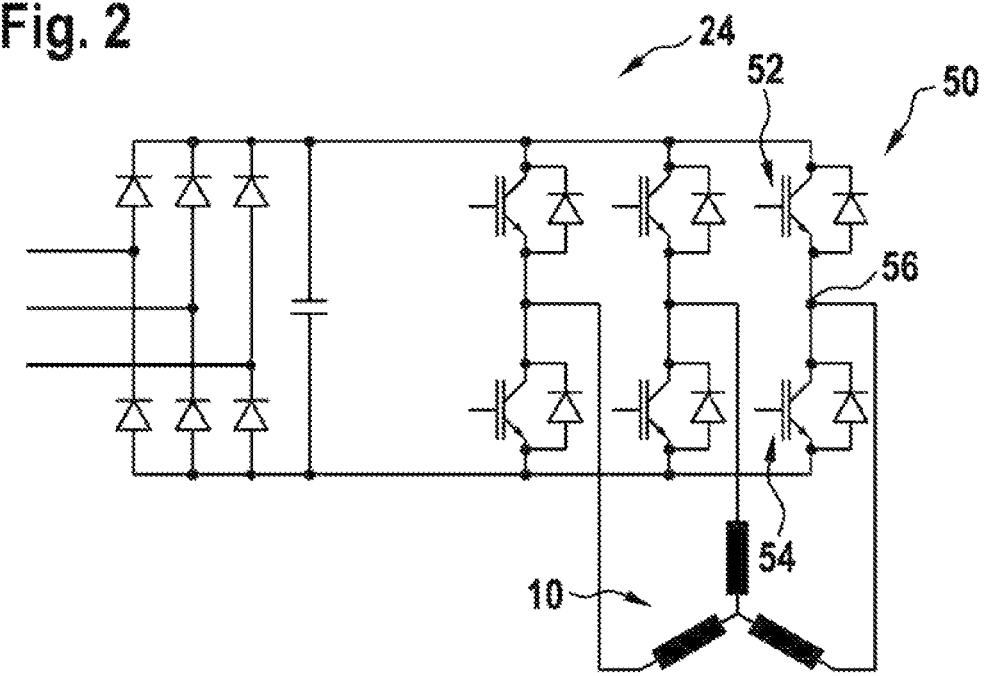
FIG. 2 illustrates a control circuit and an electric motor of the steering apparatus in a schematic illustration.

FIG. 2 illustrates a simplified exemplary circuit diagram of a known per se control circuit 24 of the steering apparatus for controlling the electric motor 10.

The control circuit 24 is embodied as an inverter unit and/or as an end stage. The control circuit 24 comprises at least one inverter 50. In the present case, the control circuit 24 comprises multiple inverters 50 that are in particular embodied as identical to one another, wherein each phase of the electric motor 10 is allocated to one of the inverters 50. Each of the inverters 50 comprises two circuit breakers 52, 54 that are in particular embodied as identical to one another. The circuit breakers 52, 54 are embodied as power semiconductor switches, such as by way of example MOSFETs and/or IGBTs. Each of the circuit breakers 52, 54 is connected in an electrically-conductive manner to a center tap 56 of the corresponding inverter 50. Each of the inverters 50 is provided for the purpose of converting a pulsing rectified voltage of an energy source into a phase current and for the purpose of supplying the electric motor 10, in particular precisely one phase of the electric motor 10, via the respective center tap 56. In the present case, the control circuit 24 is at least provided for the purpose of setting a torque of the electric motor 10 in dependence upon a rotational speed of the electric motor 10, said torque being correlated with the phase current.

Figure 3A:
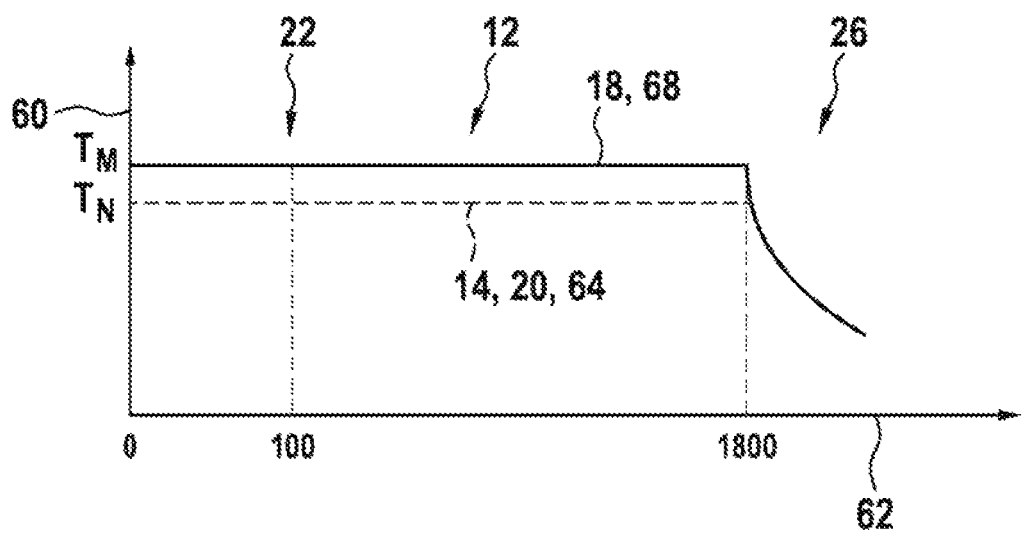
FIG. 3a-c illustrate exemplary graphs of different signals of the electric motor.
Figure 3B:
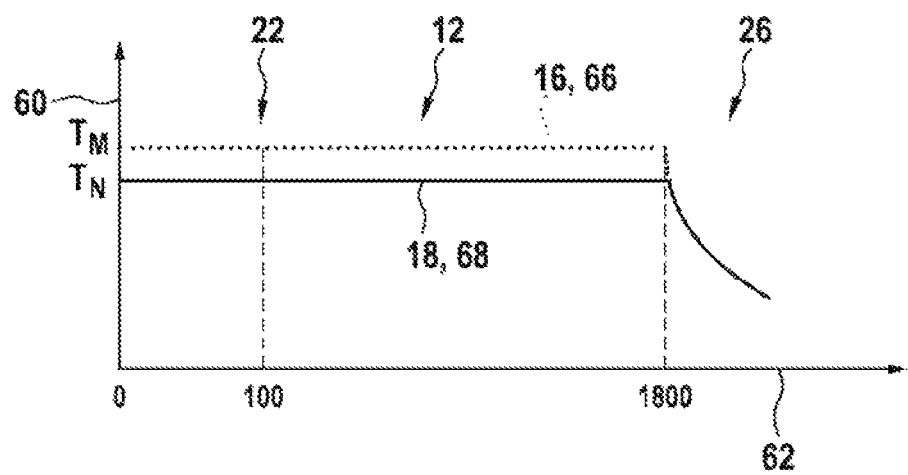
Figure 3C:
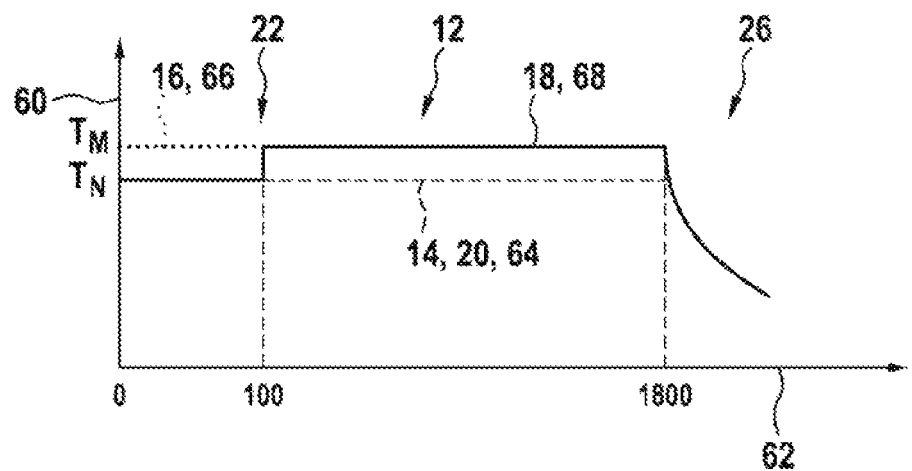

Such signals and/or characteristic curves of the electric motor 10 in which the torque is plotted over the rotational speed are illustrated in the FIGS. 3a to 3c. A torque of the electric motor 10 is plotted on an ordinate axis 60. A rotational speed of the electric motor 10 is illustrated on an abscissa axis 62. A first dashed line 64 illustrates a nominal torque 14 of the electric motor 10 ($=T_N$). In this case, the nominal torque 14 is in general designed for an operating point in which the electric motor 10 must output a full torque when the motor shaft is at a standstill, by way of example when steering against a curb. A second dashed line 66 illustrates a maximum torque 16 of the electric motor 10 ($=T_M$). The maximum torque 16 of the electric motor 10 corresponds to a maximum torque that the electric motor 10 may output and/or provide owing to limitations of an energy supply, in particular a maximum current. In this case, the maximum torque 16 is approximately 5% to 10% above the nominal torque 14. A curve 68 defines a limit torque 18 of the electric motor 10. The limit torque 18 specifies an upper limit and/or limitation for the torque of the electric motor 10 and said upper limit and/or limitation may be specified using control technology. During operation, it is consequently possible to control and/or set all torque values below the limit torque 18.

Moreover, it is possible with the aid of the FIGS. 3a to 3c to see that the electric motor 10 comprises a basic setting range 12 and a field-weakening range 26 that directly adjoins the basic setting range 12. The basic setting range 12 in the present case is between 0 rpm and 1800 rpm and defines a rotational speed range of the electric motor 10 in which the nominal torque 14, the maximum torque 16 and the limit torque 18 are constant. The field-weakening range 26 conversely corresponds to a rotational speed range of the electric motor 10 in which the nominal torque 14, the maximum torque 16 and the limit torque 18 of the electric motor 10 drop with an increasing rotational speed owing to a limited vehicle electrical system voltage. Alternatively, a basic setting range could also be by way of example between 0 rpm and 1000 rpm or between 0 rpm and 1600 rpm or other values.

In specific driving situations, such as by way of example when parking, it is advantageous if the prespecified electric motor 10 is operated at least in the basic setting range 12 at least temporarily using an increased torque that is between the nominal torque 14 and the maximum torque 16. In this case, in particular a maximum output power of the electric motor 10 remains unchanged when the electric motor 10 is operated using a torque that is increased in comparison to the nominal torque 14. The operation using the increased torque may however lead to problems owing to an increased temperature load of the electric motor 10 and/or further components of the steering apparatus, in particular the control circuit 24. In particular, in states in which the motor shaft of the electric motor 10 does not rotate or rotates particularly slowly, such as by way of example when steering against a curb, this may lead to damage in particular to the electric motor 10 and/or the control circuit 24 owing to an increased temperature load.

For this reason, it is proposed that in at least one operating state in which the electric motor 10 is operated in particular using an increased torque between the nominal torque 14 and the maximum torque 16, in dependence upon at least one temperature parameter of the electric motor 10 the limit torque 18 of the electric motor 10 is at least temporarily and in particular actively limited to a torque 20 that is reduced in comparison to the maximum torque 16 and namely in particular is limited to the nominal torque 14. In the present case, the computing unit 28 is provided so as to limit the limit torque 18 in dependence upon the temperature parameter. In principle, a limitation could however also be applied to a reduced torque that deviates from a nominal torque and/or a gradual limitation could also be applied to the nominal torque, by way of example in at least two, at least three and/or at least four steps. Moreover, a limit torque could also be limited in principle in an operating state in which an electric motor is operated using a torque below a nominal torque, in particular owing to external temperature influences, such as by way of example during mountain pass driving.

The temperature parameter may be correlated with a temperature of the electric motor 10, with a temperature of the control circuit 24, in particular of a circuit breaker 52, 54, with a movement of the motor shaft of the electric motor 10, with a rotor position of the electric motor 10, with a prevailing rotational speed of the electric motor 10, with a phase current of the electric motor 10 and/or a period of time in which the electric motor 10 is operated using a torque that is increased in comparison to the nominal torque 14 and said temperature parameter may be ascertained by way of example by means of a sensor system of the control device and/or the sensor unit and/or may be calculated using control signals and/or a temperature model. The limit torque 18 may consequently be limited to the reduced torque 20 by way of example in dependence upon sensor values of the sensor system and/or the sensor unit or may be limited in a time-controlled manner.

In this context, FIG. 3a illustrates in an exemplary manner an operating state of the electric motor 10 in which the limit torque 18 is identical to the maximum torque 16, while FIG. 3b illustrates an operating state of the electric motor 10 in which the limit torque 18 has been limited to the reduced torque 20 and/or the nominal torque 14. In accordance with FIG. 3b, the limit torque in this case is limited in the entire basic setting range 12.

Advantageously, as is illustrated in particular in FIG. 3c it is however also possible to only limit the limit torque 18 to the reduced torque 20 in an operating state in which a prevailing rotational speed of the electric motor 10 is below a limit rotational speed 22, wherein the limit rotational speed 22 is preferably between 20 rpm and 180 rpm and particularly preferably between 50 rpm and 100 rpm. In the present case, the limit rotational speed 22 is an exemplary 100 rpm. In accordance with FIG. 3c, in dependence upon the temperature parameter of the electric motor 10 the limit torque 18 is only at least temporarily limited to the reduced torque 20 in a lower rotational speed range of the electric motor 10, while in an upper rotational speed range, in particular above the limit rotational speed 22, the limit torque 18 is not limited in particular since in this case when the electric motor 10 is operated using a torque that is increased in comparison to the reduced torque 20 and/or the nominal torque 14 a temperature load of the steering apparatus owing to the higher rotational speed of the electric motor 10 is distributed onto the various components of the electric motor 10 and or the control circuit 24.

In order to avoid and/or to reduce detriments in the steering sensation as a result of a rapidly varying torque, the limitation of the limit torque 18 to the reduced torque 20 is removed in at least one further operating state in which a prevailing rotational speed of the electric motor 10 reaches the field-weakening range 26 of the electric motor 10 and/or the electric motor 10 is operated over a defined period of time, by way of example of at least 5 min, using the reduced torque 20 and/or below the reduced torque 20. In this case, the limitation is removed in such a manner that the limit torque 18 is identical to the maximum torque 16.

Moreover, the temperature parameter is taken into account when the limitation is removed. Consequently, the limitation of the limit torque 18 is only removed in the event of the temperature parameter being below a defined limit value. In principle, a limitation could however also be removed in such a manner that a limit torque is identical to a torque that is different to a maximum torque. Moreover, a procedure of taking into account a temperature parameter could also be omitted when a limitation is removed. In this case, by way of example it is conceivable to use a purely time-based control.

The FIGS. 4a to 10b in the following exemplary graphs illustrate different signals of the electric motor 10 and/or the control of the electric motor 10. In this case, the FIGS. 4b to 10b are respectively allocated to the corresponding FIGS. 4a to 10a with the result that figures having the same numeral respectively form a pair together.

In the case of the FIGS. 4a to 10a, a torque of the electric motor 10 is respectively plotted on an ordinate axis 70. A time is illustrated on an abscissa axis 72. A curve 74 illustrates a torque 84 that is requested by the computing unit 28. A curve 76 illustrates a torque 86 that is provided by the electric motor 10. In the case of the FIGS. 4b to 10b, a torque of the electric motor 10 is respectively plotted on an ordinate axis 78. A rotational speed of the electric motor 10 is illustrated on an abscissa axis 80. A curve 82 illustrates an exemplary change of the torque in dependence upon the rotational speed.

Figure 4A:
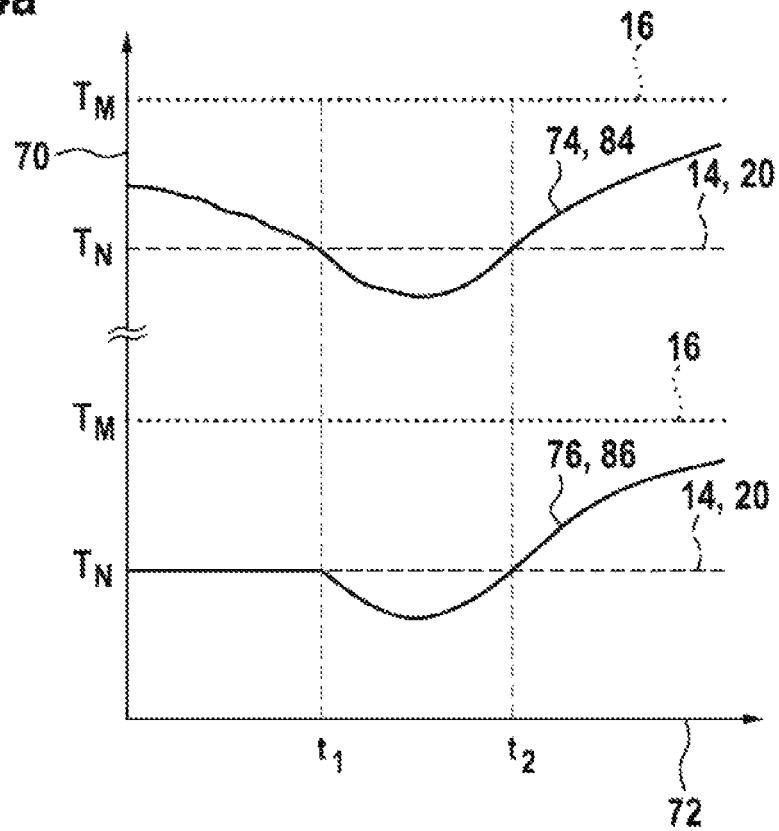
FIG. 4a-b illustrate exemplary graphs of different signals of the electric motor and/or the control of the electric motor.
Figure 4B:
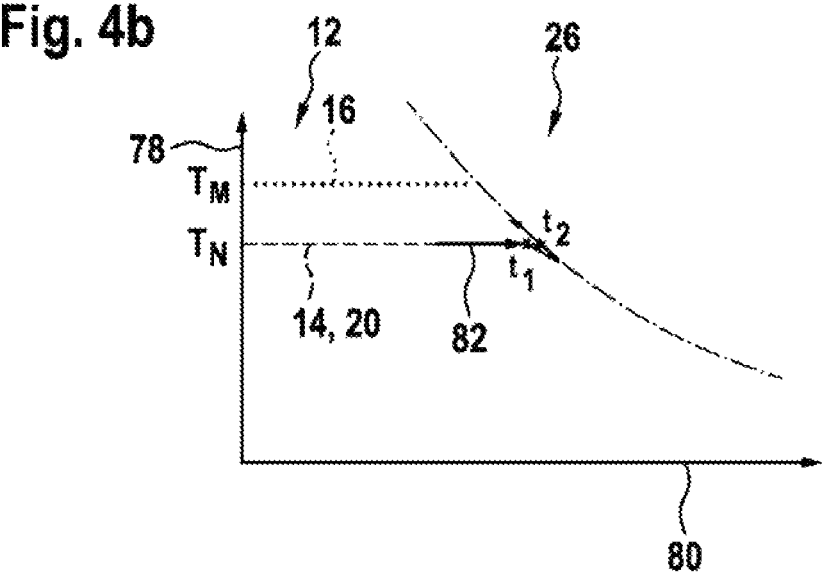

The FIGS. 4a and 4b illustrate an operating state in which the limit torque 18 and consequently the provided torque 86 is initially limited to the reduced torque 20 and/or the nominal torque 14 and the limitation is removed at a point in time $t_1$. Consequently, the provided torque 86 may again follow the requested torque 84 after a point in time $t_2$ for torques above the reduced torque 20 and/or the nominal torque 14. As is illustrated in particular in FIG. 4b, in this case the limitation is removed in an operating state in which a prevailing rotational speed of the electric motor 10 reaches the field-weakening range 26 of the electric motor 10 as a result of which in particular it is possible to achieve a particularly advantageous steering sensation since the field-weakening range 26 cannot be influenced by means of controlling the electric motor 10 but rather is specified and/or prespecified by means of a design of the electric motor 10. Moreover, a prevailing rotational speed of the electric motor 10 transfers into the basic setting range 12 at the point in time $t_2$.

Figure 5A:
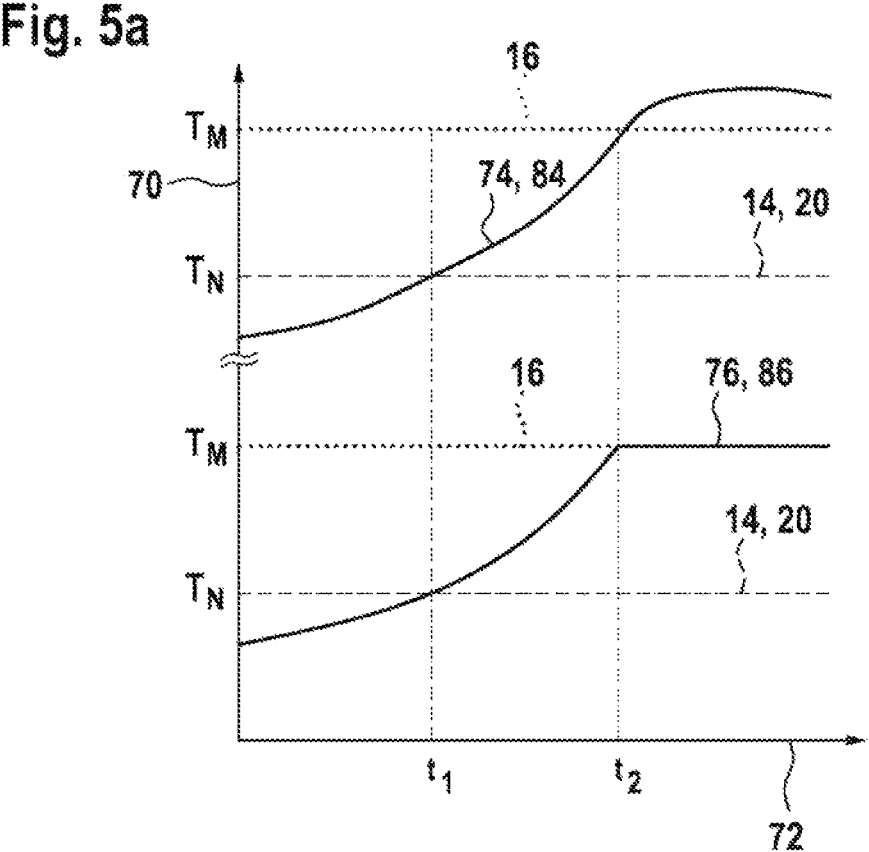
FIG. 5a-b illustrate exemplary graphs of different signals of the electric motor and/or the control of the electric motor.
Figure 5B:
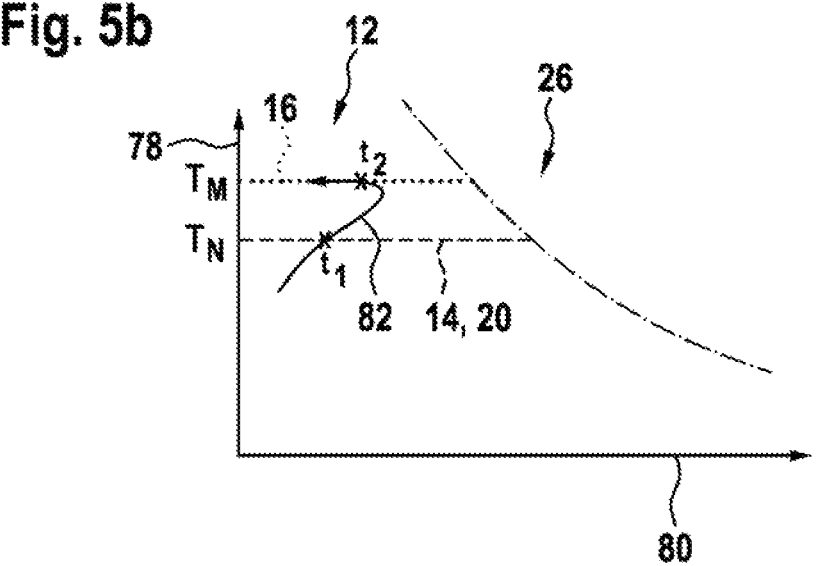

The FIGS. 5a and 5b illustrate an operating state in which the provided torque 86 is initially below the reduced torque 20 and/or the nominal torque 14 and at a point in time $t_1$ exceeds the reduced torque 20 and/or the nominal torque 14. At a point in time $t_2$, the provided torque 86 is limited to the maximum torque 16, while the requested torque 84 surpasses the maximum torque 16. In the present case, the provided torque 86 cannot be increased above the maximum torque 16 owing to structural limitations and/or taking into account safety-technical aspects. Since in the illustrated case the provided torque 86 is not changed abruptly, the driver in this case does not perceive the excessive increase of the provided torque 86 as irritating.

Figure 6A:
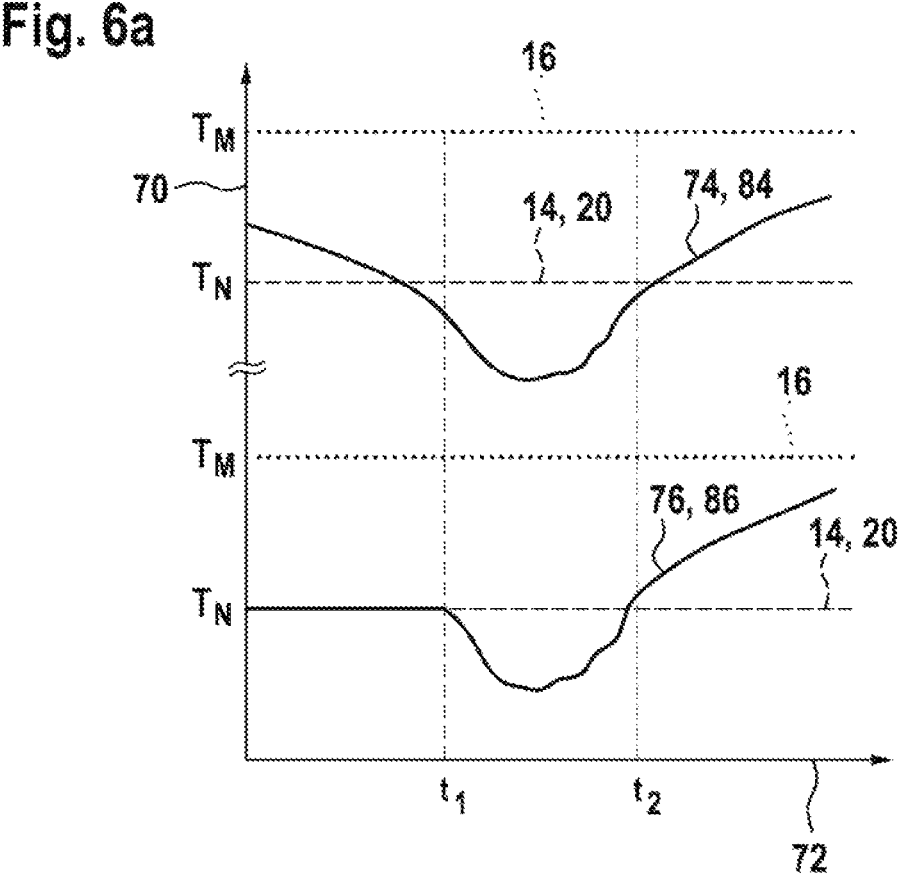
FIG. 6a-b illustrate exemplary graphs of different signals of the electric motor and/or the control of the electric motor.
Figure 6B:
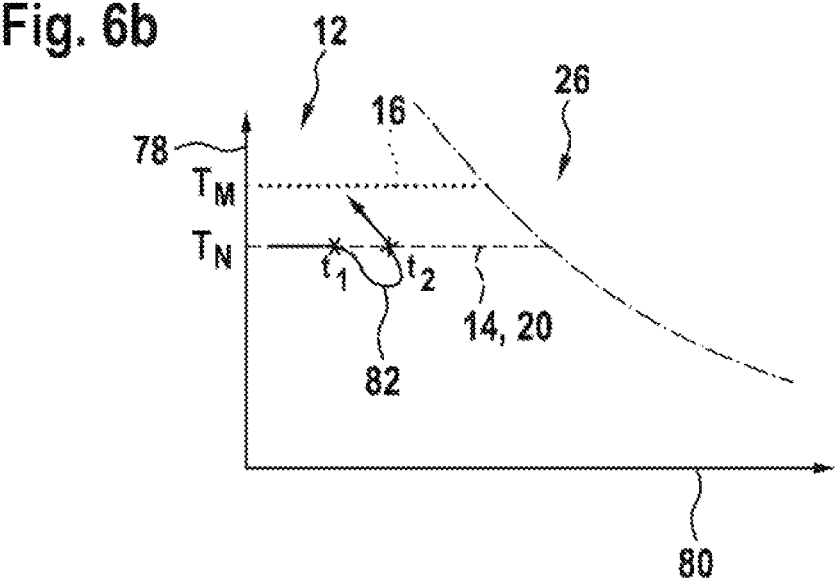

The FIGS. 6a and 6b illustrate an operating state in which the limit torque 18 and consequently the provided torque 86 is initially limited to the reduced torque 20 and/or the nominal torque 14 and the limitation is removed between a point in time $t_1$ and a point in time $t_2$. Consequently, the provided torque 86 may again also follow the requested torque 84 after a point in time $t_2$ for torques above the reduced torque 20 and/or the nominal torque 14. In this case, the limitation is removed since the electric motor 10 has been operated over a defined period of time, by way of example of at least 5 min, using the reduced torque 20 and/or the nominal torque 14 and/or below the reduced torque 20 and/or the nominal torque 14.

The FIGS. 7a and 7b illustrate an operating state in which the limit torque 18 and consequently the provided torque 86 is initially limited to the reduced torque 20 and/or the nominal torque 14 and the limitation is removed at a point in time $t_1$. In this case, the limitation is removed since the electric motor 10 has been operated over a defined period of time, by way of example of at least 5 min, using the reduced torque 20 and/or the nominal torque 14. Moreover, the limitation is removed in such a manner that a transition from a prevailing torque and/or the provided torque 86 to the requested and in particular increased torque 84 is performed by means of a continuous and differentiable function, in the present case in particular a sigmoid function, and in particular is not performed abruptly, as a result of which in particular it is possible to achieve a smoother transition and/or it is advantageously possible to improve a steering sensation. At a point in time $t_2$, the provided torque 86 is at least temporarily limited to the maximum torque 16, while the requested torque 84 is at least temporarily above the maximum torque 16.

The FIGS. 8a and 8b illustrate an operating state in which the electric motor 10 is initially operated using a torque that is increased in comparison to the reduced torque 20 and/or the nominal torque 14, the limit torque 18 and consequently the provided torque 86 however are only limited to the reduced torque 20 and/or the nominal torque 14 at a point in time $t_1$ in which a prevailing torque and/or the provided torque 86 is below the reduced torque 20 and/or the nominal torque 14. As a consequence, in particular it may be possible to limit the limit torque 18, which advantageously does not have an effect on a steering sensation of a driver, with the result that it may be advantageously ensured that the driver does not notice the limitation in the steering sensation. In this case, reasons for the limitation may be by way of example external temperature influences such as by way of example during mountain pass driving.

Figure 9A:
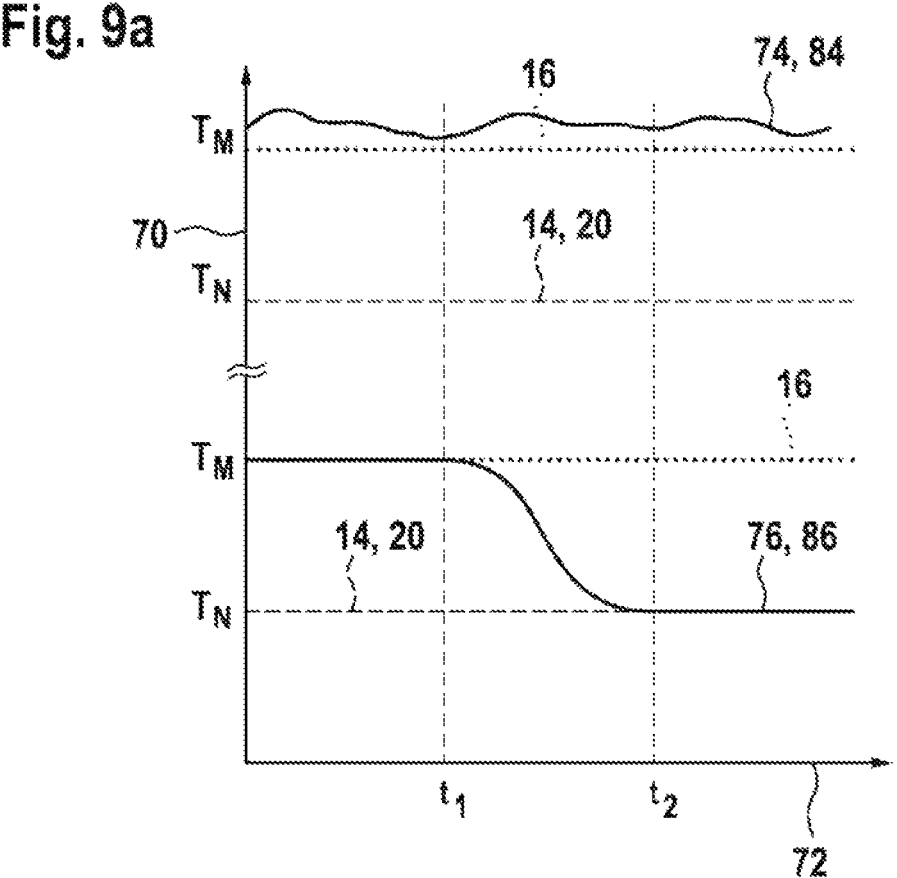
FIG. 9a-b illustrate exemplary graphs of different signals of the electric motor and/or the control of the electric motor.
Figure 9B:
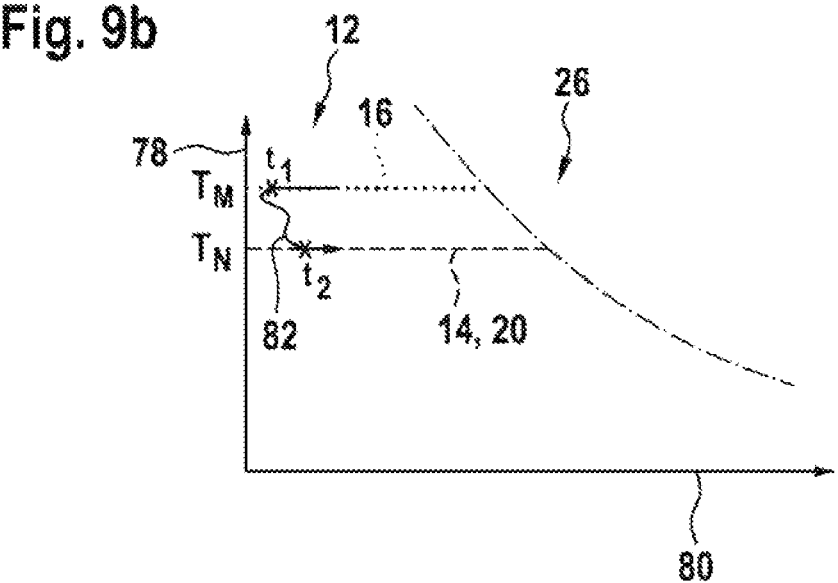

The FIGS. 9a and 9b illustrate an operating state in which the limit torque 18 is initially limited to the maximum torque 16 and the provided torque 86 is identical to the maximum torque 16. Consequently, the electric motor 10 in this case is operated using an increased torque, which is between the nominal torque 14 and the maximum torque 16. At a point in time t₁ at which a prevailing rotational speed of the electric motor 10, in particular is below the limit rotational speed 22 and/or exceeds the temperature parameter, in dependence upon the temperature parameter the limit torque 18 is actively limited to the reduced torque 20 and/or the nominal torque 14. Since the electric motor 10 is operated in this operating state using a torque that is increased in comparison to the reduced torque 20 and/or the nominal torque 14, a transition is performed from the increased torque to the reduced torque 20 and/or the nominal torque 14 by means of a continuous and differentiable function, in the present case in particular a sigmoid function, as a result of which it is possible to achieve in particular an advantageous steering sensation. In particular, in this case the driver becomes accustomed to the changed conditions and is not irritated.

Figure 10A:
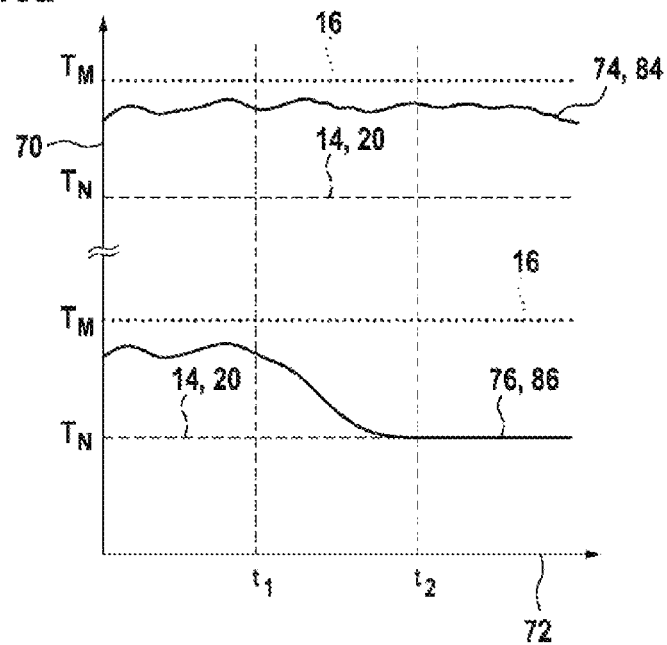
FIG. 10a-b illustrate exemplary graphs of different signals of the electric motor and/or the control of the electric motor and FIG. 11 illustrates an exemplary flow diagram of a method for operating the steering apparatus.
Figure 10B:
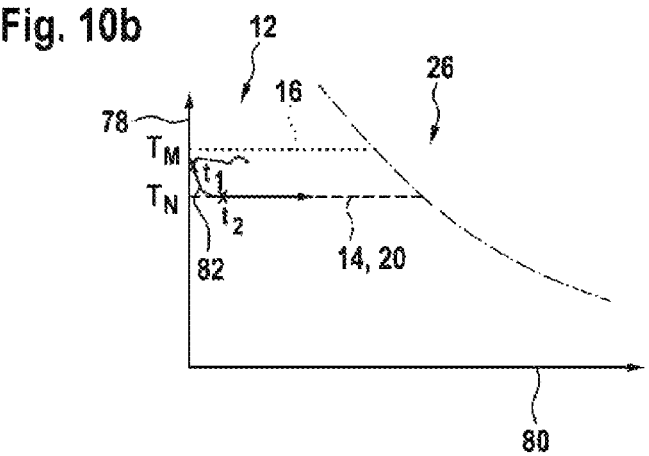

The FIGS. 10*a* and 10*b* illustrate an operating state in which the electric motor 10 is initially operated using an increased torque that is between the nominal torque 14 and the maximum torque 16. At a point in time t₁ at which a prevailing rotational speed of the electric motor 10 is in particular below the limit rotational speed 22, in dependence upon the temperature parameter the limit torque 18 is actively limited to the reduced torque 20 and/or the nominal torque 14. A transition is in turn performed from the increased torque to the reduced torque 20 and/or the nominal torque 14 by means of a continuous and differentiable function, in the present case in particular a sigmoid function.

Figure 11:
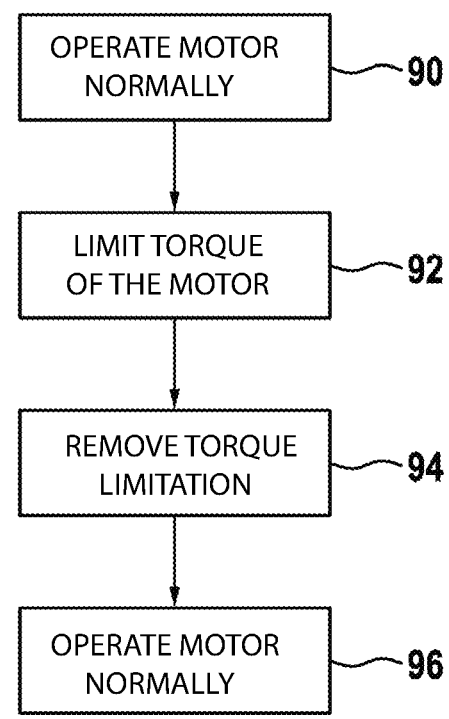

FIG. 11 illustrates an exemplary flow diagram of a method of this type for operating the steering apparatus, wherein the computing unit 28 is provided for the purpose of implementing the method and comprises for this purpose in particular a computer program having corresponding program code means.

In a method step 90, the electric motor 10 is operated normally. In this case, the electric motor 10 is used in particular so as to produce the electric steering assistance.

In a method step 92, it is established that the temperature parameter exceeds a limit value. Consequently, in dependence upon the temperature parameter the limit torque 18 is actively limited to a torque 20 that is reduced in comparison to the maximum torque 18 and namely in particular the nominal torque 14.

In a method step 94, the limitation of the limit torque 18 is removed. The limitation is removed in this case in at least one further operating state in which a prevailing rotational speed of the electric motor 10 reaches the field-weakening range 26 and/or the electric motor 10 is operated over a defined period of time using the reduced torque 20 and/or the nominal torque 14 and/or below the reduced torque 20 and/or the nominal torque 14. In addition, the temperature parameter is taken into account when the limitation is removed, wherein the limitation of the limit torque 18 is only removed in the event of the temperature parameter being below the limit value.

In a method step 96, the electric motor 10 is in turn operated normally.

The invention claimed is:

1. A method for operating a steering apparatus that comprises at least one electric motor, the method comprising:
   operating the at least one electric motor in an entire basic setting range using an increased torque that is greater than a nominal torque of the at least one electric motor and less than or equal to a maximum torque of the at least one electric motor; and
   at least temporarily limiting a limit torque of the at least one electric motor to a reduced torque that is reduced in comparison to the maximum torque, in at least one operating state and in dependence upon at least one temperature parameter,
   wherein the reduced torque is the nominal torque of the at least one electric motor.

2. The method as claimed in claim 1, wherein in the at least one operating state a prevailing rotational speed of the at least one electric motor is below a limit rotational speed.

3. The method as claimed in claim 2, wherein the limit rotational speed is between 20 rpm and 180 rpm.

4. The method as claimed in claim 1, further comprising:
   keeping unchanged a maximum output power of the at least one electric motor when the at least one electric motor is operated using the increased torque that is increased in comparison to the nominal torque of the at least one electric motor.

5. The method as claimed in claim 1, further comprising:
   performing continuously a transition from the increased torque to the reduced torque in at least one case in which the at least one electric motor is operated in the at least one operating state using a torque that is increased in comparison to the reduced torque.

6. The method as claimed in claim 5, further comprising:
   only limiting the limit torque to the reduced torque if a prevailing torque is below the reduced torque, in at least one further case in which the at least one electric motor is operated in the at least one operating state using a torque that is increased in comparison to the reduced torque.

7. The method as claimed in claim 1, further comprising:
   removing the limitation of the limit torque to the reduced torque in at least one further operating state in which a prevailing rotational speed of the at least one electric motor reaches a field-weakening range of the at least one electric motor and/or the at least one electric motor is operated over a defined period of time using the reduced torque and/or the nominal torque and/or below the reduced torque and/or the nominal torque.

8. The method as claimed in claim 7, further comprising:
   taking the at least one temperature parameter into account when the limitation is removed.

9. The method as claimed in claim 7, further comprising:
   removing the limitation such that a transition from a prevailing torque to a required increased torque is performed continuously.

10. The method as claimed in claim 1, wherein a control device of the steering apparatus includes a computing unit configured to implement the method.

11. A method for operating a steering apparatus that comprises at least one electric motor, the method comprising:
    operating the at least one electric motor in an entire basic setting range using an increased torque that is between a nominal torque of the at least one electric motor and a maximum torque of the at least one electric motor;
    at least temporarily limiting a limit torque of the at least one electric motor to a reduced torque that is reduced in comparison to the maximum torque, in at least one operating state and in dependence upon at least one temperature parameter; and
    correlating the at least one temperature parameter with a temperature of the at least one electric motor, with a temperature of a control circuit of the at least one electric motor, with a movement of a motor shaft of the at least one electric motor, with a rotor position of the at least one electric motor, with a prevailing rotational speed of the at least one electric motor, with a phase current of the at least one electric motor, and/or with a period of time in which the at least one electric motor is operated using the increased torque that is increased in comparison to the nominal torque.

12. A steering apparatus comprising:
at least one electric motor configured for operation in an entire basic setting range using an increased torque that is greater than a nominal torque of the at least one electric motor and less than or equal to a maximum torque of the at least one electric motor; and
a computing unit configured to at least temporarily limit a limit torque of the at least one electric motor to a reduced torque that is reduced in comparison to the maximum torque, in at least one operating state and in dependence upon at least one temperature parameter,
wherein the reduced torque is the nominal torque of the at least one electric motor.

* * * * *